US012752878B2

(12) United States Patent
Chu

(10) Patent No.: US 12,752,878 B2
(45) Date of Patent: Oct. 6, 2026

(54) ELECTRIC SCOOTER REAR SWING ARM STRUCTURE

(71) Applicant: Daimler Chu, New Taipei City (TW)

(72) Inventor: Daimler Chu, New Taipei City (TW)

( * ) Notice: Subject to any disclaimer, the term of this patent is extended or adjusted under 35 U.S.C. 154(b) by 200 days.

(21) Appl. No.: 18/829,316

(22) Filed: Sep. 10, 2024

(65) Prior Publication Data

US 2025/0091688 A1 Mar. 20, 2025

(30) Foreign Application Priority Data

Sep. 18, 2023 (TW) ................................ 112135554

(51) Int. Cl.
*B62K 25/20* (2006.01)
*B62K 3/00* (2006.01)

(52) U.S. Cl.
CPC .............. *B62K 25/20* (2013.01); *B62K 3/002* (2013.01); *B62K 2204/00* (2013.01)

(58) Field of Classification Search
CPC ................................ B62K 25/20; B62K 25/26
See application file for complete search history.

(56) References Cited

U.S. PATENT DOCUMENTS

| | | | | |
|---|---|---|---|---|
| 4,408,674 A * | 10/1983 | Boyesen | B62K 25/26 | 267/222 |
| 4,556,119 A * | 12/1985 | Shiratsuchi | B62K 25/283 | 180/219 |
| 2016/0244119 A1* | 8/2016 | Ishida | B62K 25/286 | |

FOREIGN PATENT DOCUMENTS

| | | | |
|---|---|---|---|
| CN | 108407957 A * | 8/2018 | B62L 1/02 |
| CN | 217348106 U * | 9/2022 | |
| DE | 102020203556 A1 * | 10/2020 | B62K 25/283 |
| JP | 2023150537 A * | 10/2023 | B62K 25/20 |
| WO | WO-2004080789 A1 * | 9/2004 | B62K 25/20 |

* cited by examiner

*Primary Examiner* — Alexander K Garlen
(74) *Attorney, Agent, or Firm* — Leong C. Lei

(57) ABSTRACT

A rear swing arm structure for an electric scooter includes a pedal rear portion, a telescopic shock-absorbing unit, two swing arm units, and connecting rods. The swing arm unit is pivotally connected to the pedal rear portion, with the first connecting rod linking the telescopic shock absorber and the second connecting rod connecting the swing arm unit and the first rod. When the rear wheel encounters vibration, the swing distance of the first connecting rod adjusts to match the rear wheel's movement. This automatic adjustment balances shock absorption and buffering, preventing the system from being too hard or soft. This design improves comfort, reduces tail swinging and slipping, and enhances grip during turns, resulting in smoother control and increased safety on various road surfaces.

10 Claims, 7 Drawing Sheets

ELECTRIC SCOOTER REAR SWING ARM STRUCTURE

FIELD OF THE INVENTION

The present invention relates to the field of electric scooter technology, particularly to a telescopic shock-absorbing unit that can automatically adjust the shock-absorbing stroke of the rear wheel in response to the scooter's various sliding statuses and different road surfaces. This adjustment achieves a balance in shock-absorbing and cushioning forces, thereby preventing the rear swing arm structure of the scooter from being too hard or too soft.

BACKGROUND OF THE INVENTION

As electric scooters are generally heavy, when riden on bumpy and uneven roads or encountering potholes, they are subjected to greater vibration and impact, which will make the riders feel uncomfortable. The riding stability is also insufficient, which affects the riding safety.

Therefore, electric scooters, especially large electric scooters, are usually equipped with shock absorbers to improve riding comfort and stability, as well as safety performance.

In order to reduce the large bump and vibration impact force encountered by the large size vehicle, large electric scooters are usually equipped with shock absorbers on the front and rear wheels. The common electric scooter rear wheel shock absorber structure usually includes a pedal rear part, a rear swing arm, and a shock absorber, wherein one end of the rear swing arm is movably connected to the pedal rear part, while the rear wheel is connected to the other end of the rear swing arm. The shock absorber is usually a combination of a telescopic cylinder and a shock absorber spring, the upper side of which is connected to the pedal rear part, and the lower side is connected to the rear swing arm. However, this shock absorber has at least the following disadvantages:

Since the upper and lower sides of the shock absorber are arranged between the rear side of the pedal and the rear swing arm, the shock absorbing stroke length is limited due to space constraints, and the shock absorber is closer to the pivot point of one end of the rear swing arm at the rear side of the pedal than the wheel body, that is, the common swing fulcrum of the shock absorber and the rear swing arm, while the upper and lower sides of the rear wheel at the other end of the rear swing arm can swing up and down arbitrarily. Therefore, when the rear wheel is subjected to vibration impact force, the vibration magnitude of the rear wheel is always greater than the shock absorption of the shock absorber. The stroke, i.e. the shock absorption and cushioning force generated by the shock absorber, and the vibration and impact force of the rear wheel can never be effectively balanced. Once the electric scooter is in various sliding statuses and on different road surfaces, the shock absorption and cushioning force of the shock absorber will often be too hard or too soft, which will affect the shock absorption comfort of the electric scooter, and it is easy to drift and slip during sliding, and the rear wheel has poor grip, which affects the smoothness of the electric scooter's control and the safety of sliding on the road.

In summary, the rear wheel shock-absorbing structure and function of traditional electric scooters are still not ideal, and there is a need for improvement.

In view of this, the inventor of the present invention, based on the concept of continuous product improvement and innovation, and many years of professional practical experience in this field, as well as active and dedicated research and development, and considerable design experiments.

SUMMARY OF THE INVENTION

An object of the present invention is to provide a telescopic shock-absorbing unit with a shock-absorbing stroke length that can automatically correspond to the vibration of the rear wheel in various sliding states and on different road surfaces of the electric scooter, so as to achieve a balance of shock-absorbing and buffering forces and avoid a scooter rear swing arm structure to be too hard or too soft.

To achieve the above-mentioned purposes, the invention includes a pedal rear portion, a telescopic shock absorber unit, two swing arm units, two first connecting rods and a second connecting rod, wherein the pedal rear portion is provided with a first assembly seat and two second assembly seats; one end of the telescopic shock absorber unit is movably pivoted to the first assembly seat; one end of the swing arm unit is movably pivoted to the first position of the second assembly seat, and the other end of the swing arm unit is provided with a wheel body assembly portion for assembling a rear wheel; one end of the first connecting rod is movably pivoted to the other end of the telescopic shock absorber unit, and the other end of the first connecting rod is movably pivoted to the second position of the second assembly seat; one end of the second connecting rod is movably pivoted to the swing arm unit, and the other end of the second connecting rod is movably pivoted to the first connecting rod.

The effective improvement of the present invention is that when the rear wheel is subjected to the vibration impact force, the swing distance of one end of the first connecting rod can automatically correspond to the swing distance of the rear wheel assembly of the swing arm unit, i.e. the shock absorbing stroke length of the telescopic shock absorbing unit. It is aimed at the scooter in various sliding statuses and different road surfaces, and automatically corresponds to the vibration degree of the rear wheel to achieve the balance of the shock absorbing and buffering force, avoiding being too hard or too soft. In addition to improving the shock absorbing comfort, it can avoid tail swinging and slipping during sliding, and enhance the grip when turning and bending, as well as improve the overall control smoothness of the scooter and the safety of sliding on the road.

Other features and specific implementation examples of this invention are further understood in the following detailed descriptions with accompanying drawings.

DETAILED DESCRIPTION OF PREFERRED EMBODIMENTS

Figure 1:
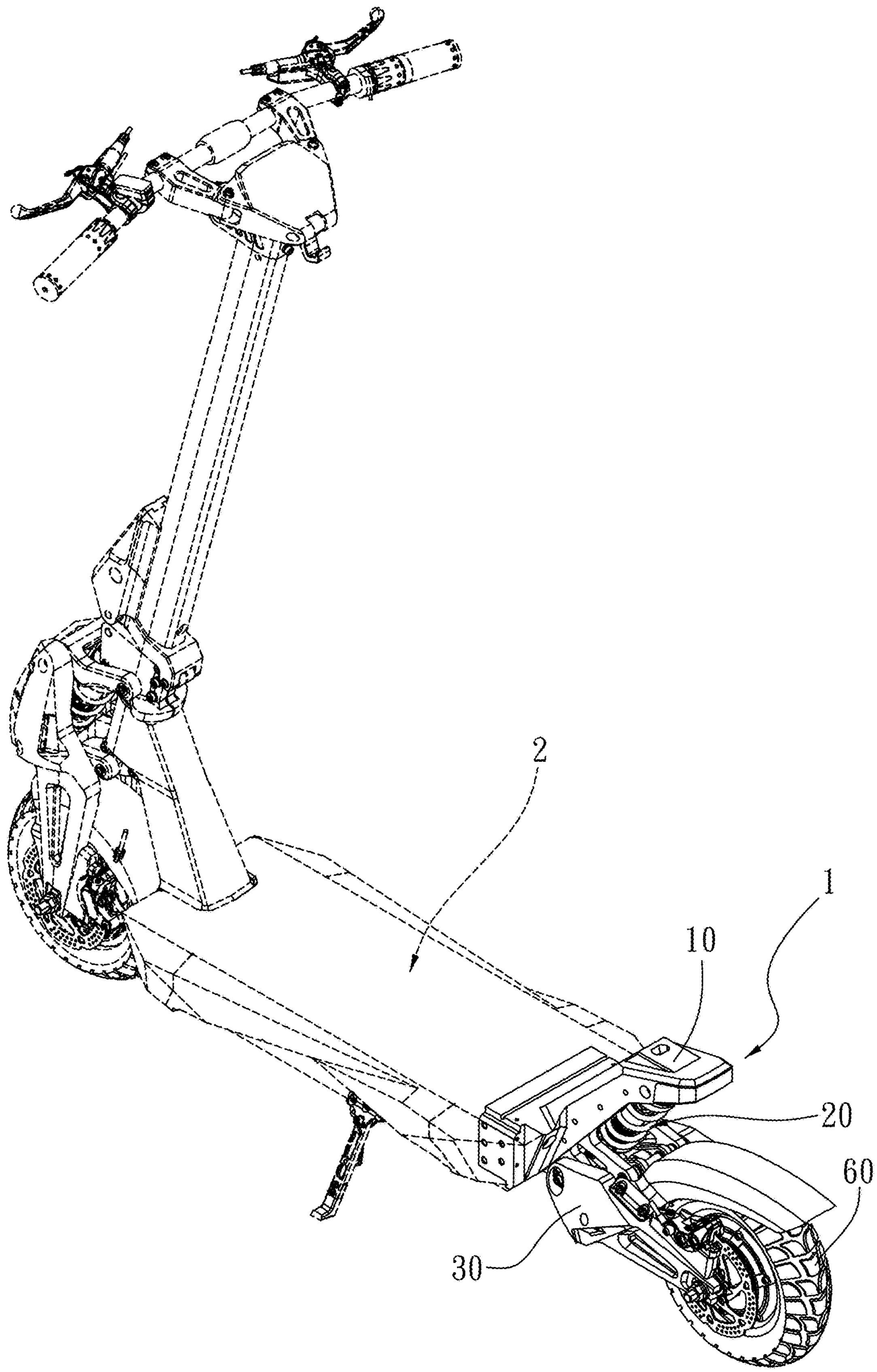
FIG. 1 is a three-dimensional view of the invention.
Figure 2:
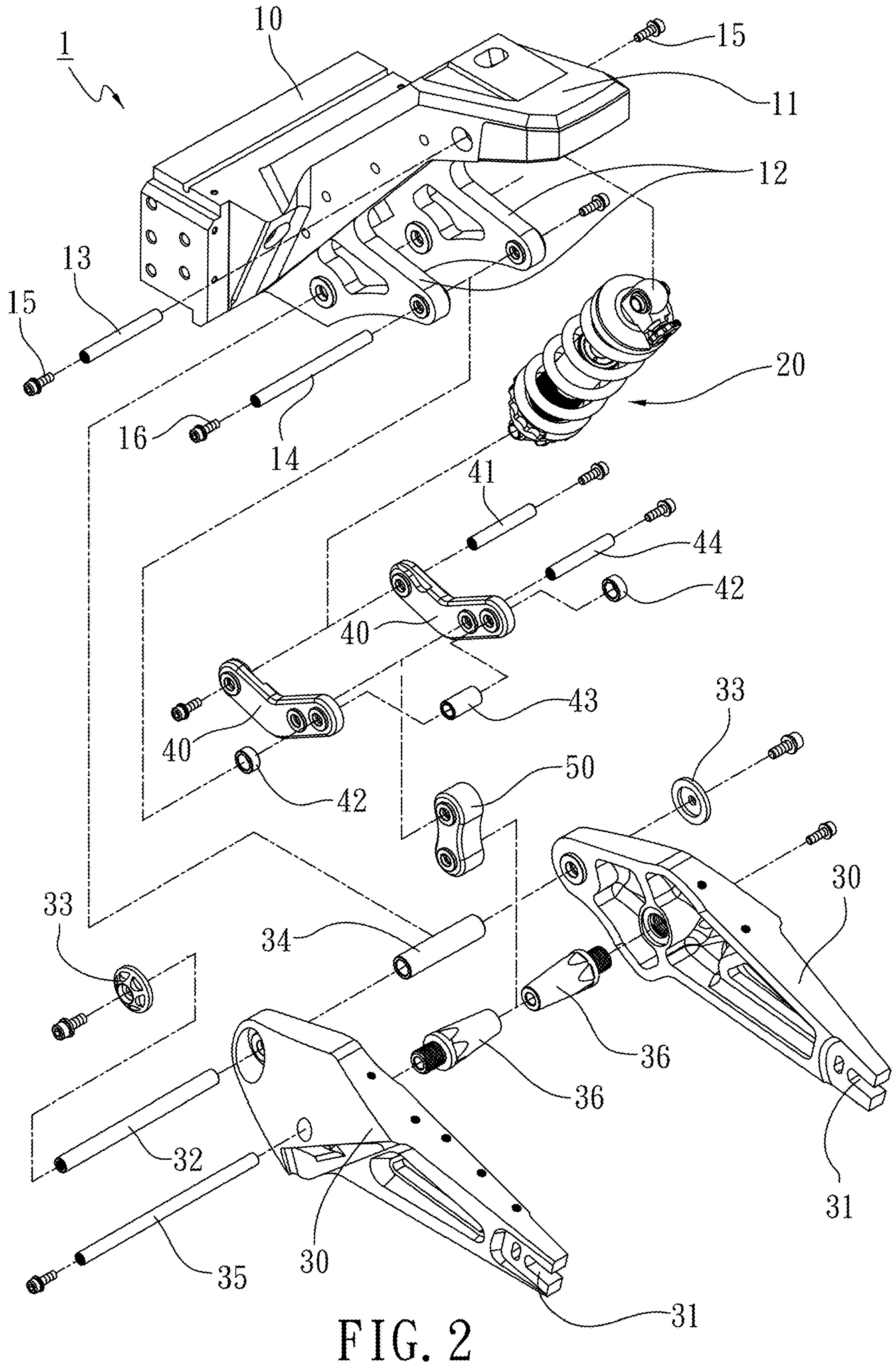
FIG. 2 is a 3D exploded view of the invention.
Figure 3:
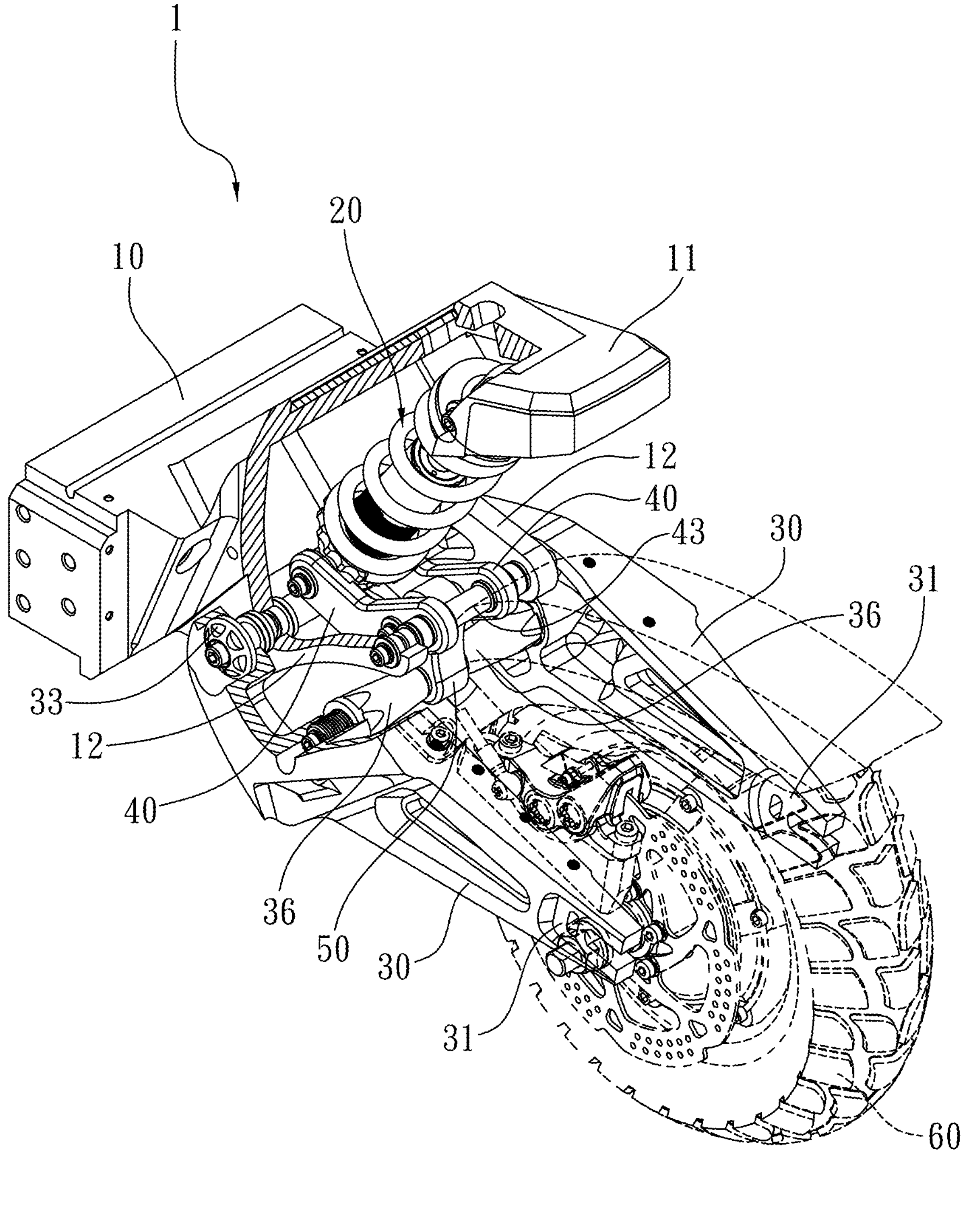
FIG. 3 is a partial cross-sectional three-dimensional view of the invention.
Figure 4:
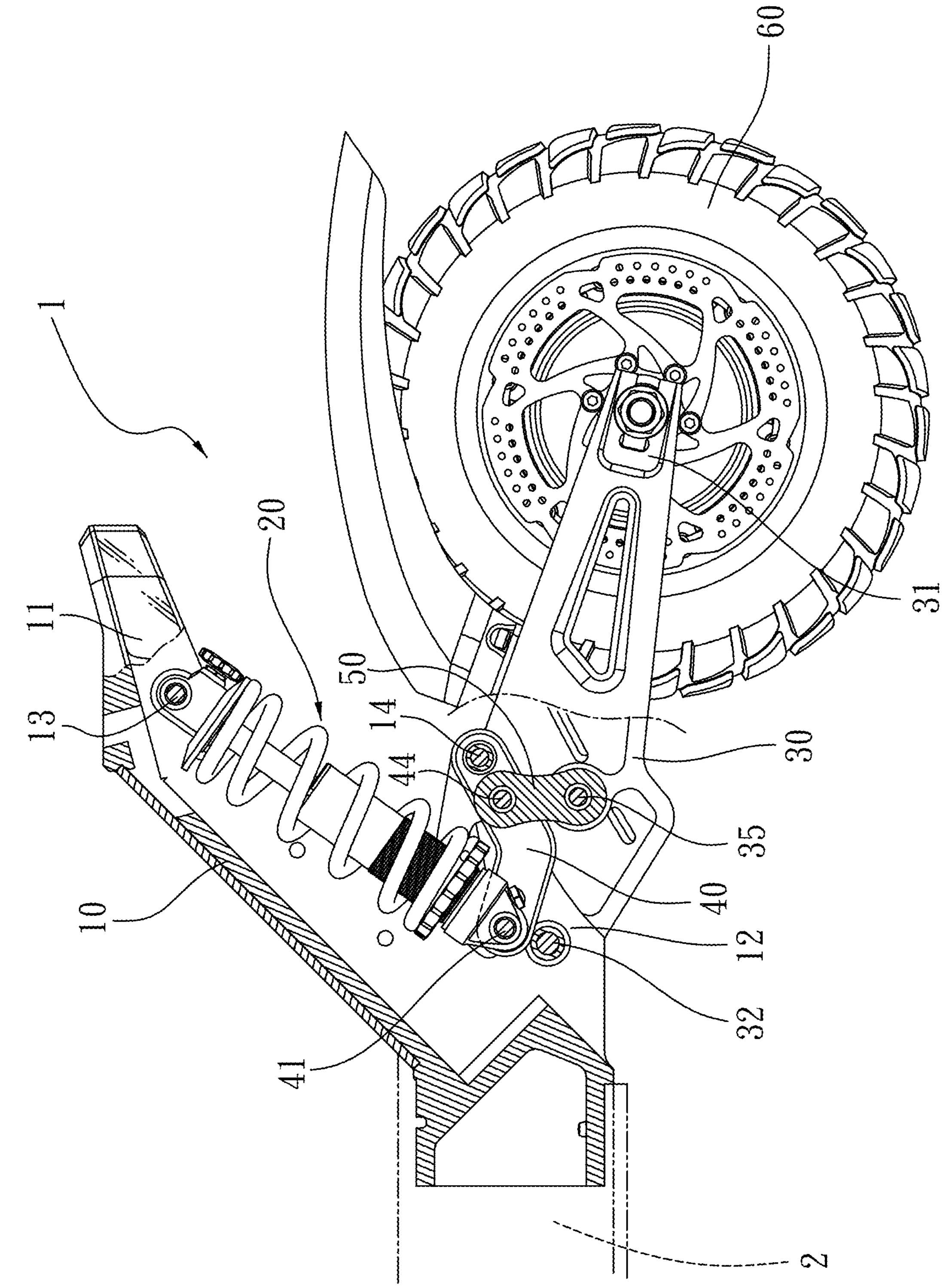
FIG. 4 is a cross-sectional view of the invention.

As shown in FIGS. 1 to 5, the rear swing arm structure 1 of the electric scooter of the present invention is disposed at the rear wheel position of the scooter 2 in this embodiment, but the invention is not limited this configuration. The rear swing arm structure 1 of the scooter includes a rear pedal portion 10, a telescopic shock absorbing unit 20, two swing arm units 30, two first connecting rods 40 and a second connecting rod 50. The detailed descriptions are as follows:

The rear pedal portion 10 is provided with a first set of receiving seats 11 and two second sets of receiving seats 12.

One end of the telescopic shock absorbing unit 20 is movably connected to the first set of receiving seats 11.

The swing arm unit 30 has one end movably pivoted to the first position of the second receiving seats 12 and the other end is provided with a rear wheel assembly portion 31 for assembling a rear wheel 60.

The first connecting rod 40 has one end movably pivoted to the lower end of the telescopic shock absorbing unit 20, and the other end movably pivoted to the second position of the second set of receiving seats 12.

The second connecting rod 50 has one end movably connected to the swing arm unit 30 and the other end movably connected to the first connecting rod 40.

The telescopic shock absorbing unit 20 is movably connected to the first set of receiving seats 11 by a shaft 13 passing through the first set of receiving seats 11 and one end of the telescopic shock absorbing unit 20. Both ends of the shaft 13 are secured by screws 15.

The swing arm unit 30 is movably connected to the first position of the second receiving seat 12 by a shaft rod 32 that passes through the first position of the second receiving seat 12 and one end of the swing arm unit 30. The two ends of the shaft rod 32 are secured by two locking covers 33 and screws.

The surface of the shaft rod 32 is further sleeved with a shaft sleeve 34, and the two side end surfaces of the shaft sleeve 34 are stopped at the corresponding surfaces of the swing arm unit 30, so that a space is defined between the swing arm units 30 to avoid interference with the movement of the telescopic shock absorbing unit 20, the first connecting rod 40 and the second connecting rod 50.

The first connecting rod 40 passes through the base end of telescopic shock absorbing unit 20 and one end of the first connecting rod 40 through a shaft 41, and is movably connected to the other base end of the telescopic shock absorbing unit 20. Both ends of the shaft 41 are locked by screws.

The first connecting rod 40 is movably pivoted to the second position of the second receiving seat 12 via a shaft 14 that passes through the second position of the second receiving seat 12 and the other end of the first connecting rod 40. The two ends of the shaft 14 are locked by screws 16. Two bearings 42 are further provided at the pivot point of the other end of the first connecting rod 40.

The surface of the shaft 14 is further sleeved with a sleeve 43, and the two side end surfaces of the sleeve 43 are stopped at the corresponding surfaces of the first connecting rod 40, so that a space is defined between the first connecting rod 40 to avoid interference with the movement of the telescopic shock absorbing unit 20.

The first connecting rod 40 is in form of a V shape.

The second connecting rod 50 is movably connected to the swing arm unit 30 via a shaft 35 that passes through the swing arm unit 30 and one end of the second connecting rod 50. Both ends of the shaft 35 are locked by screws.

The surface of the shaft 35 is further sleeved with two positioning sleeves 36, one side of the positioning sleeve 36 is screwed and stopped on the corresponding surface of the swing arm unit 30, and one end of the second connecting rod 50 is stopped between the two positioning sleeves 36 to position one end of the second connecting rod 50 to prevent it from sliding improperly on the shaft 35.

The second connecting rod 50 is movably connected to the first connecting rod 40 by a shaft 44 passing through the first connecting rod 40 and the other end of the second connecting rod 50. Both ends of the shaft 44 are locked by screws.

Figure 5:
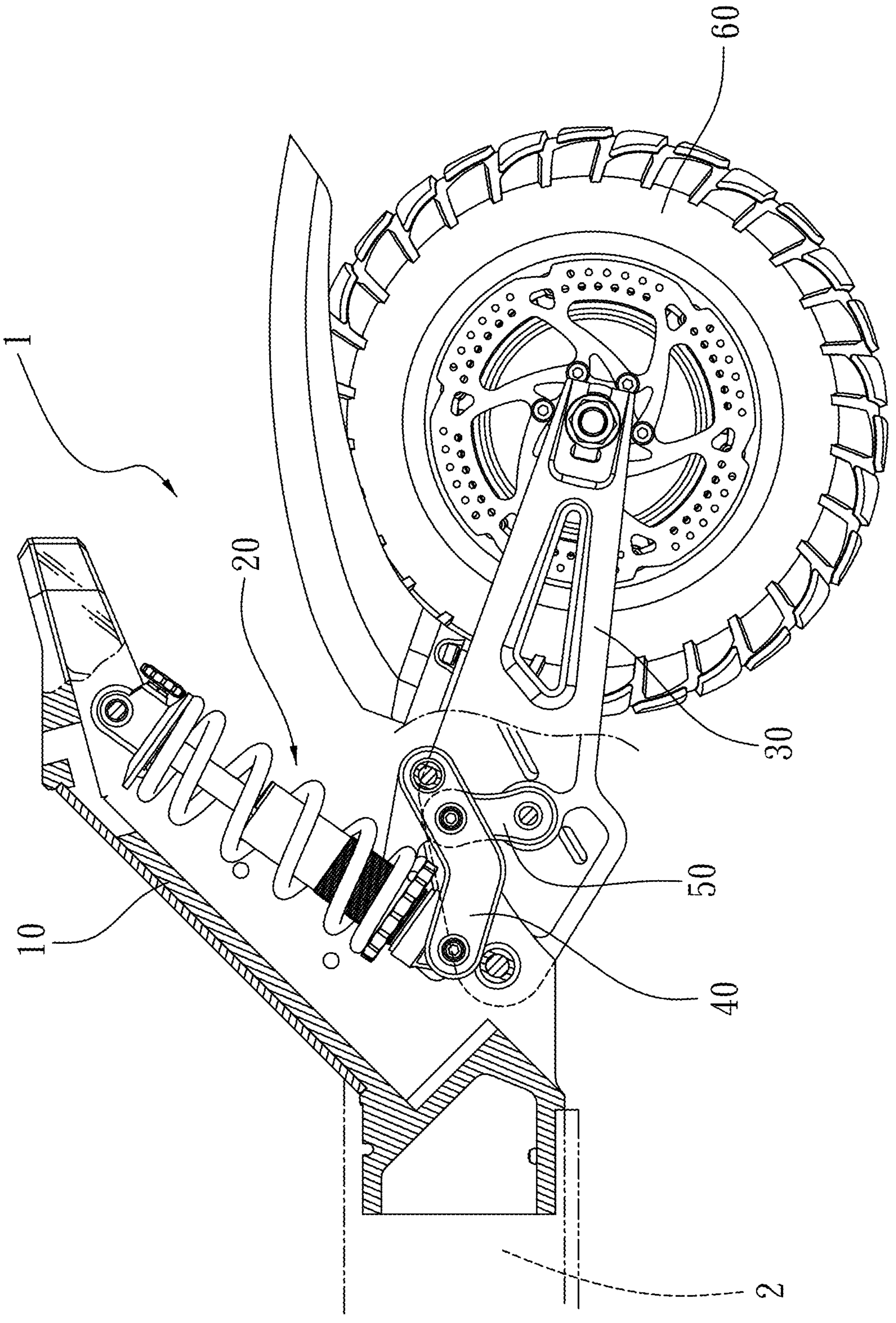
FIG. 5 is a cross-sectional view of the first example of one preferred embodiment of the invention.
Figure 6:
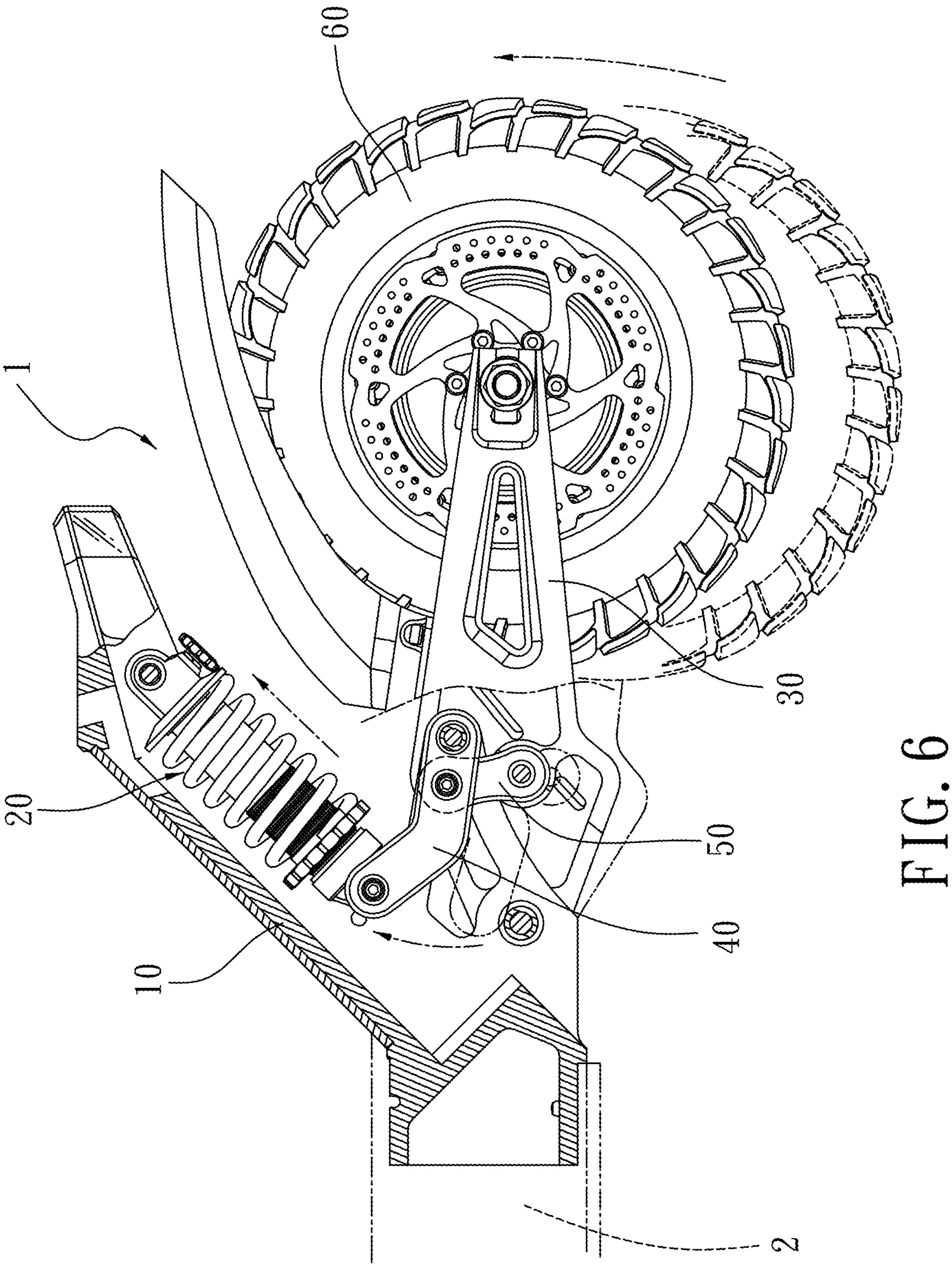
FIG. 6 is the second cross-sectional view of one preferred embodiment of the invention.
Figure 7:
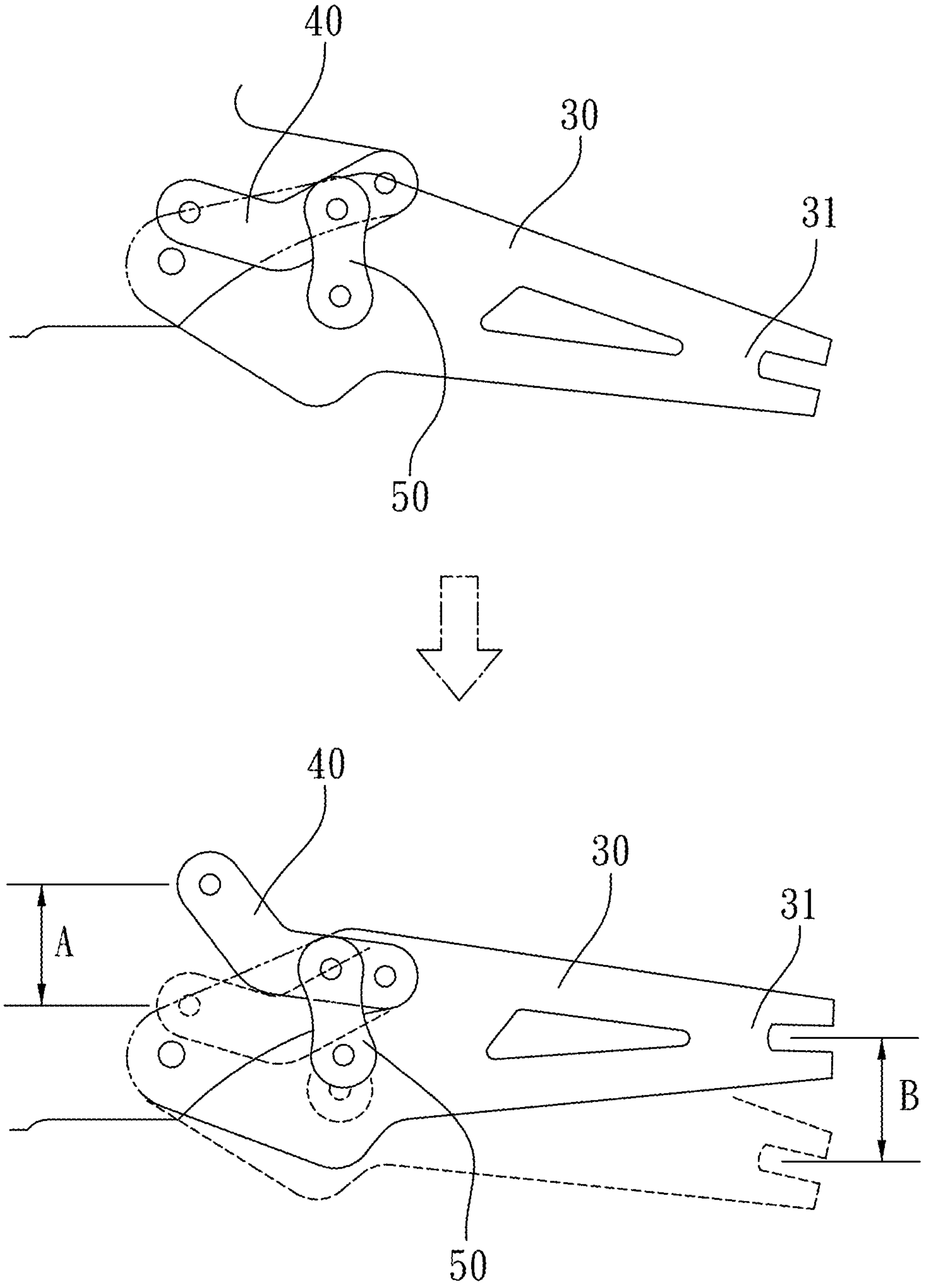
FIG. 7 is an example view showing one preferred embodiment of the invention in which the swing distance of one end of the first connecting rod automatically corresponds to the swing distance of the rear wheel connection part of the swing arm unit.

The above is an introduction to the components and their composition of this creation. In addition, the features and functions of use are introduced as follows:

As shown in FIGS. 5, 6 and 7, when the electric scooter 2 rides on a bumpy and uneven road surface or encounters a pothole, the rear wheel 60 is subjected to the bumpy vibration impact force and swings upward together with the swing arm unit 30. The upward swing of the swing arm unit 30 links the second connecting rod 50, and the second connecting rod 50 pushes the first connecting rod 40 to swing upward, thereby causing one end of the first connecting rod 40 to compress the telescopic shock absorbing unit 20 to perform a shock absorbing stroke. Since the telescopic shock absorbing unit 20 has a damping effect, a shock absorbing and buffering force can be generated.

It is particularly emphasized that the swing distance A of one end of the first connecting rod 40 can automatically correspond to the swing distance B of the rear wheel assembly 31 of the swing arm unit 30. In this embodiment, the swing distance A of one end of the first connecting rod 40 is equal to the swing distance B of the rear wheel assembly 31. That is, through the linkage relationship and action between the swing arm unit 30, the second connecting rod 50 and the first connecting rod 40, the shock absorption of the telescopic shock absorbing unit 20 is improved. The action stroke is longer than the usual one, and the length of the shock absorbing action stroke is aimed at the scooter 2 in various sliding statuses and different road surfaces, automatically corresponding to the vibration size of the rear wheel 60, to achieve a balance of shock absorption and buffering force, avoid being too hard or too soft, in addition to improving the shock absorption comfort, avoiding tail swinging and slipping during sliding, and improving the grip when turning and bending, and overall improving the smoothness of the scooter 2 control and the safety of sliding on the road.

In summary, the invention has achieved the expected purposes, providing a telescopic shock-absorbing unit with a shock-absorbing stroke length that can automatically correspond to the vibration of the rear wheel in various sliding states and on different road surfaces of the electric scooter, thereby achieving a balance of shock-absorbing and buffering forces and avoiding a scooter rear swing arm structure that is too hard or too soft. It has undoubtedly practical value, and a patent application is filed in accordance with the law.

However, the above are only the preferred embodiments of the present invention and should not be used to limit the scope of implementation of the present invention. Therefore, all simple equivalent changes and modifications made according to the scope of the patent application of this invention and the specification should still fall within the scope of the present patent.

I claim:

1. A rear swing arm structure of an electric scooter, comprising: a rear side portion of a pedal, a telescopic shock absorbing unit, two swing arm units, two first connecting rods, and a second connecting rod; wherein the rear side portion of the pedal is provided with a first set of seats and two second sets of seats, the second sets of seats having a first position and a second position respectively; one end of the telescopic shock absorbing unit is movably connected to the first set of seats; one end of each swing arm unit is movably connected to the first position of the second sets of seats, the other end of each swing arm unit is provided with a rear wheel assembly portion for assembling a rear wheel; each first connecting rod, one end of which is movably pivoted to the other end of the telescopic shock absorbing unit, and the other end of each first connecting rod is movably pivoted to the second position of the second sets of seats; the second connecting rod, one end of which is movably pivoted to the swing arm units, and the other end of the second connecting rod is movably pivoted to the first connecting rods.

2. The rear swing arm structure of the electric scooter as claimed in claim 1, wherein the telescopic shock absorbing unit is movably pivoted to the first set of seats by an axle rod penetrating the first set of seats and one end of the telescopic shock absorbing unit, and ends of the axle rod are locked by screws.

3. The rear swing arm structure of an electric scooter as claimed in claim 1, wherein each swing arm unit is movably connected to the first position of the second sets of seats by a shaft rod passing through the first position of the second sets of seats and one end of each swing arm unit, and ends of the shaft rod are locked by two locking covers and screws.

4. The rear swing arm structure of an electric scooter as claimed in claim 3, wherein a shaft sleeve is further sleeved on a surface of the shaft rod, and two side end surfaces of the shaft sleeve are stopped at corresponding surfaces of each swing arm unit, so that a space is defined between the swing arm units to avoid interference with the movement of the telescopic shock absorbing unit, each first connecting rod and the second connecting rod.

5. The rear swing arm structure of an electric scooter as claimed in claim 1, wherein each first connecting rod is movably connected to the other end of the telescopic shock absorbing unit by a shaft passing through the telescopic shock absorbing unit and one end of each first connecting rod, and ends of the shaft are locked by screws.

6. The rear swing arm structure of an electric scooter as claimed in claim 1, wherein each first connecting rod is movably connected to the second position of the second sets of seats by a shaft passing through the second position of the second sets of seats and the other end of each first connecting rod, and the two-ends of the shaft are locked by screws; the other end of each first connecting rod is further provided with two bearings at a hinge.

7. The rear swing arm structure of an electric scooter as claimed in claim 6, wherein a sleeve is further sleeved on a surface of the shaft, and two side end surfaces of the sleeve stop on corresponding surfaces of each first connecting rod, so that a space is defined between the first connecting rods to avoid interfering with the operation of the telescopic shock absorbing unit.

8. The rear swing arm structure of an electric scooter as claimed in claim 1, wherein the second connecting rod is movably connected to each swing arm unit by a shaft passing through each swing arm unit and one end of the second connecting rod, and ends of the shaft are locked by screws.

9. The rear swing arm structure of an electric scooter as claimed in claim 8, wherein a surface of the shaft is further covered with two positioning sleeves, one side of each positioning sleeve is screwed and blocked on corresponding surfaces of each swing arm unit, and the space between the two positioning sleeves blocks one end of the second connecting rod to position one end of the second connecting rod to prevent it from sliding improperly on the shaft.

10. The rear swing arm structure of an electric scooter as claimed in claim 1, wherein the second connecting rod is movably connected to each first connecting rod by a shaft passing through the other end of each first connecting rod and the second connecting rod, and ends of the shaft are locked by screws.

* * * * *